(12) United States Patent
Im et al.

(10) Patent No.: US 9,832,509 B2
(45) Date of Patent: Nov. 28, 2017

(54) MOBILE DEVICE AND METHOD FOR CONTROLLING MOBILE DEVICE FOR CUSTOMIZING ADVERTISEMENT MESSAGES DISPLAYED ON SIGNAGE DEVICE

(75) Inventors: Hyeongjin Im, Pyeongtaek-si (KR); Yunjung Kim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 313 days.

(21) Appl. No.: 13/349,870

(22) Filed: Jan. 13, 2012

(65) Prior Publication Data
US 2013/0093648 A1 Apr. 18, 2013

(30) Foreign Application Priority Data

Oct. 13, 2011 (KR) .......................... 10-2011-014392

(51) Int. Cl.
*H04N 21/414* (2011.01)
*H04N 21/422* (2011.01)
(Continued)

(52) U.S. Cl.
CPC ... *H04N 21/41407* (2013.01); *H04N 21/4122* (2013.01); *H04N 21/42204* (2013.01);
(Continued)

(58) Field of Classification Search
CPC . G06F 3/147; H04M 1/0206; H04M 2242/15; H04M 2300/026; G04N 5/38;
(Continued)

(56) References Cited

U.S. PATENT DOCUMENTS 7,701,517 B1 * 4/2010 Geronimi ................. H04N 5/64
345/1.1
2005/0262535 A1 * 11/2005 Uchida et al. .................. 725/80
(Continued)

FOREIGN PATENT DOCUMENTS

| EP | 1 521 453 A1 | 4/2005 |
|---|---|---|
| EP | 2 372 500 A1 | 10/2011 |
| WO | WO 2010/023513 A1 | 3/2010 |
| WO | WO 2010/065107 | 6/2010 |

OTHER PUBLICATIONS

European Search Report dated Aug. 21, 2012 issued in Application No. 12 00 0089.
(Continued)

*Primary Examiner* — Larry Sternbane
(74) *Attorney, Agent, or Firm* — KED & Associates, LLP

(57) ABSTRACT

A method for controlling a mobile device is provided. The method includes displaying list information including a first source device and a second source device, receiving a signal for selecting a specific source device using the list information, generating content to be distributed when the specific source device is the first source device, grouping at least one display device communicable with the specific source device into a group and displaying graphic data corresponding to the group or graphic data corresponding to each display device belonging to the group, receiving a signal for selecting at least one display device using the graphic data, and transmitting the generated content to the at least one selected display device.

7 Claims, 14 Drawing Sheets

(51) Int. Cl.
*H04N 21/431* (2011.01)
*H04N 21/462* (2011.01)
*H04N 21/41* (2011.01)
*H04N 21/436* (2011.01)

(52) U.S. Cl.
CPC ..... *H04N 21/431* (2013.01); *H04N 21/43615* (2013.01); *H04N 21/4622* (2013.01); *G09G 2360/04* (2013.01)

(58) Field of Classification Search
CPC ....... H04N 21/41407; H04N 21/42204; H04N 21/431; H04N 21/4622; H04N 21/4122; H04N 21/43615; H04W 4/02; H04W 4/021; G09G 2360/04
USPC .......................................................... 345/2.3
See application file for complete search history.

(56) References Cited

U.S. PATENT DOCUMENTS

| | | | |
|---|---|---|---|
| 2007/0136778 A1* | 6/2007 | Birger .................. | G11B 19/025 725/117 |
| 2010/0057882 A1* | 3/2010 | Haartsen et al. ............. | 709/218 |
| 2010/0211979 A1* | 8/2010 | Konno et al. .................... | 725/59 |
| 2011/0193780 A1* | 8/2011 | Schaaf .................. | G06F 1/1601 345/163 |

OTHER PUBLICATIONS

European Office Action issued in related Application No. 12000089.8 dated Apr. 9, 2014.

* cited by examiner

[FIG. 1]
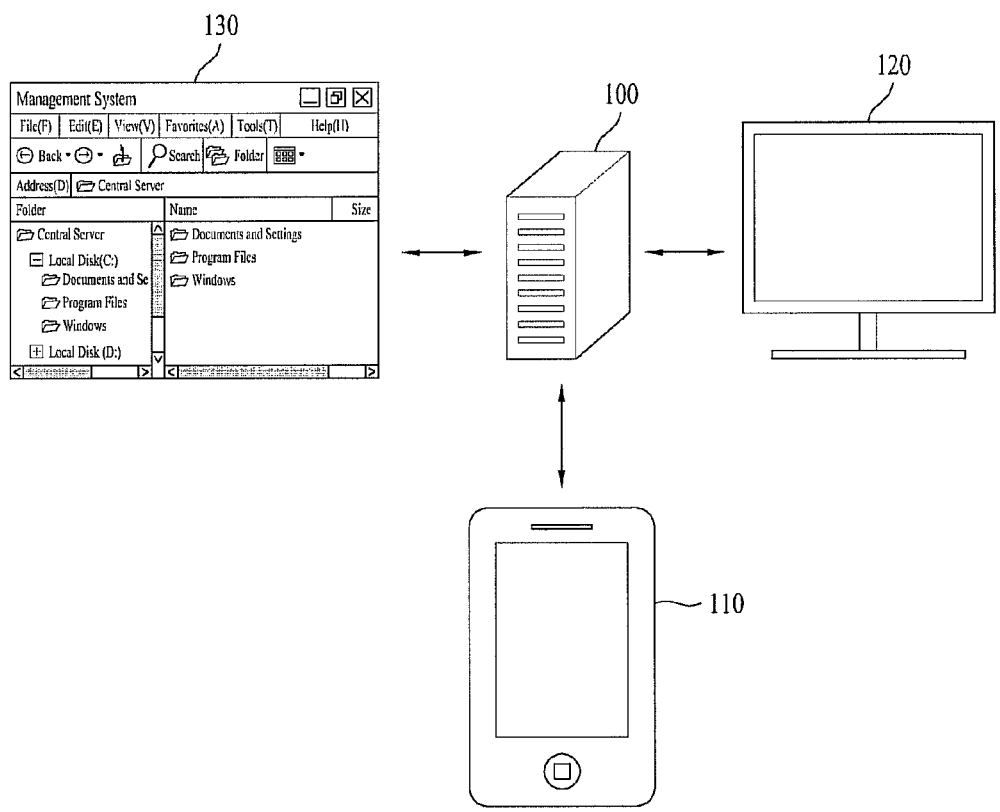

[FIG. 2]
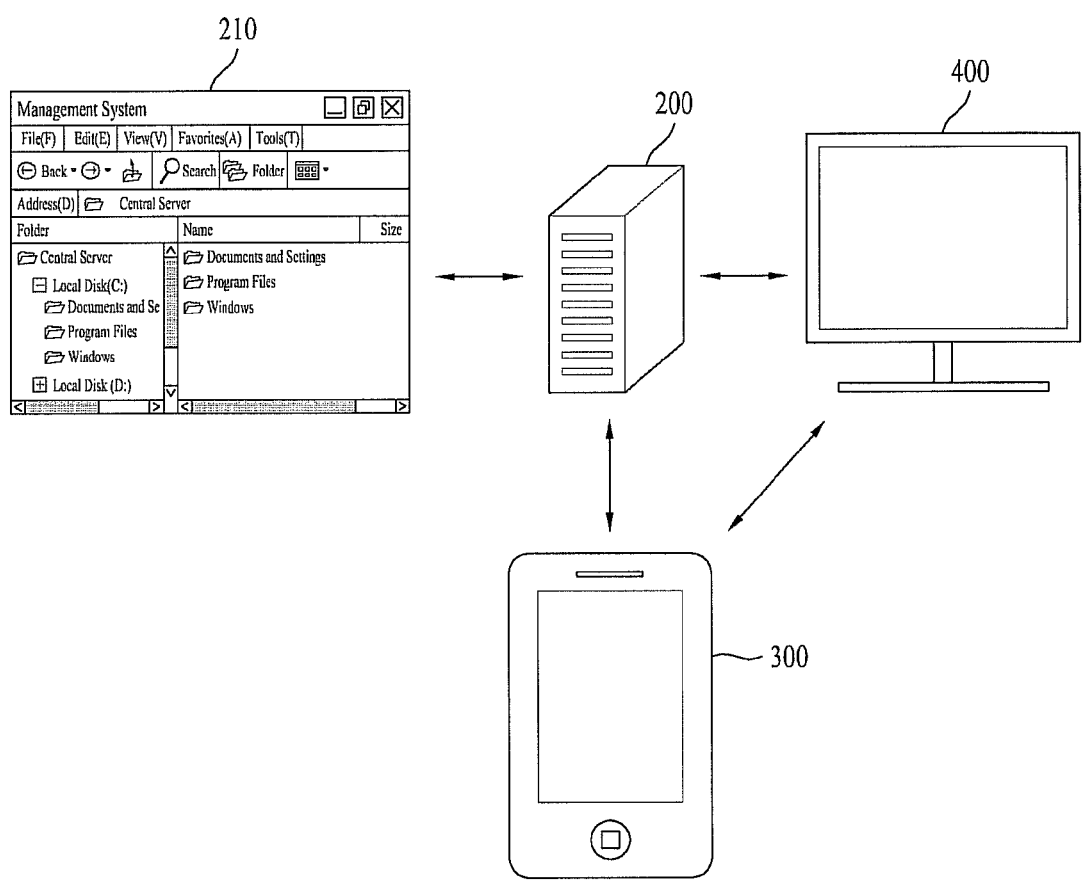

[FIG. 3]
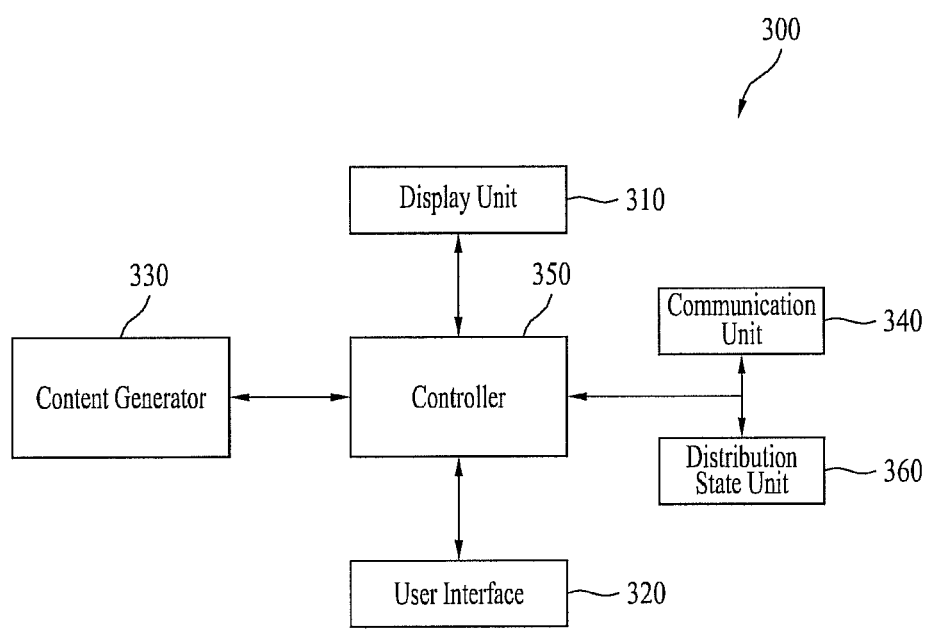

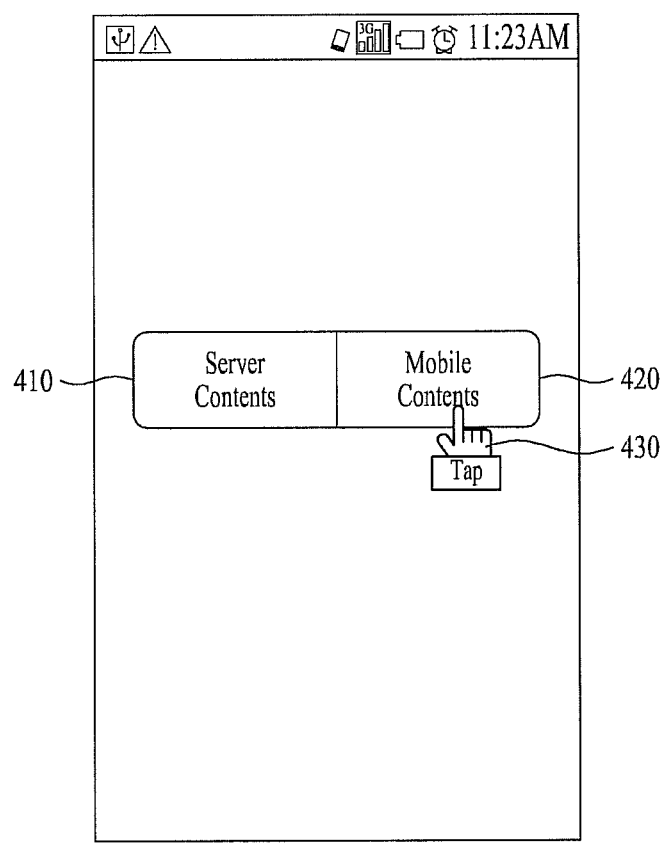

[FIG. 5]
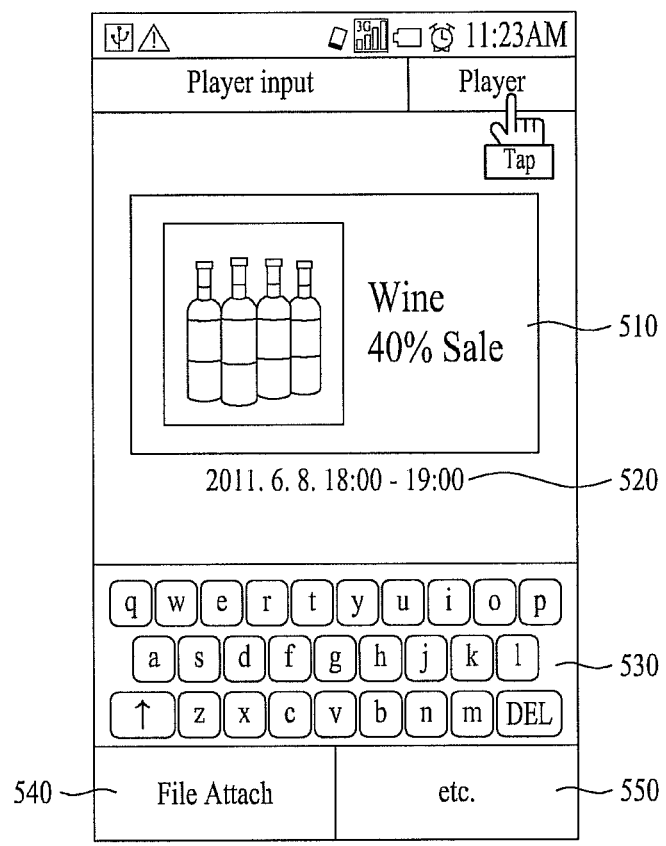

[FIG. 6]
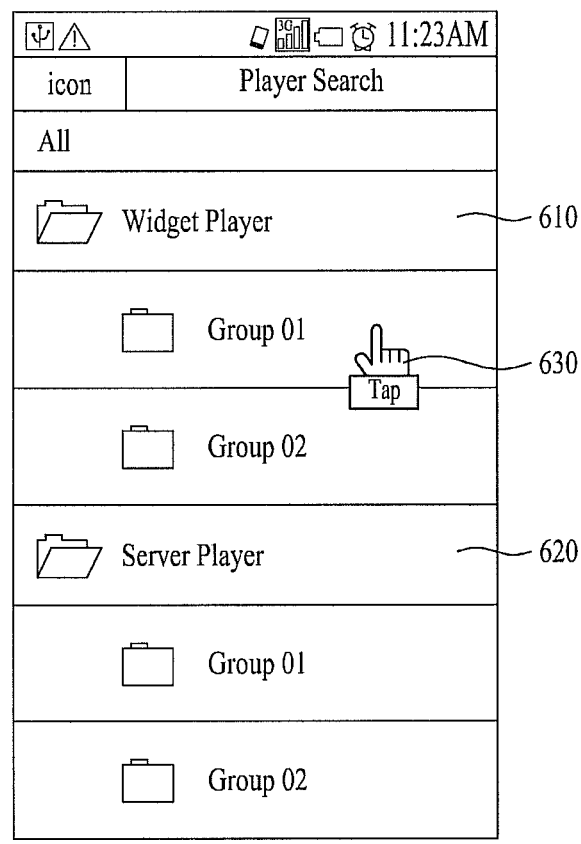

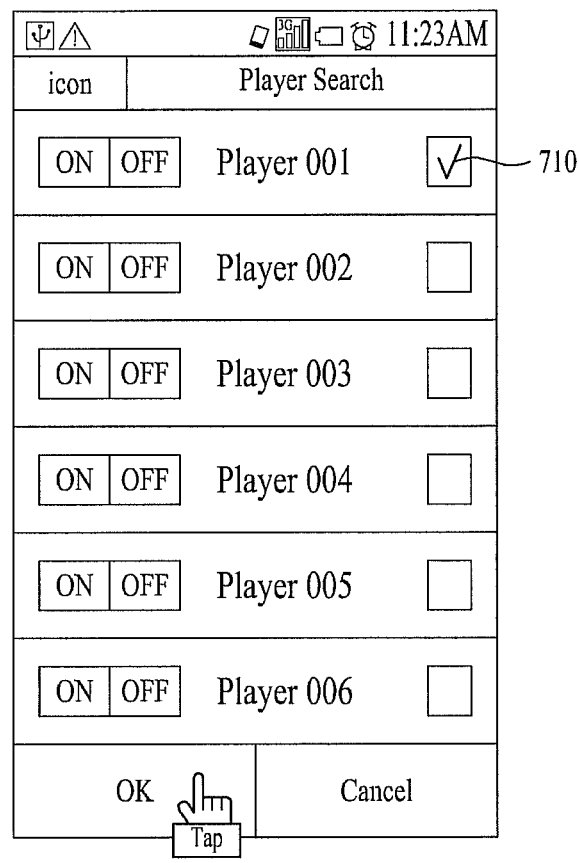
[FIG. 7]

[FIG. 8]
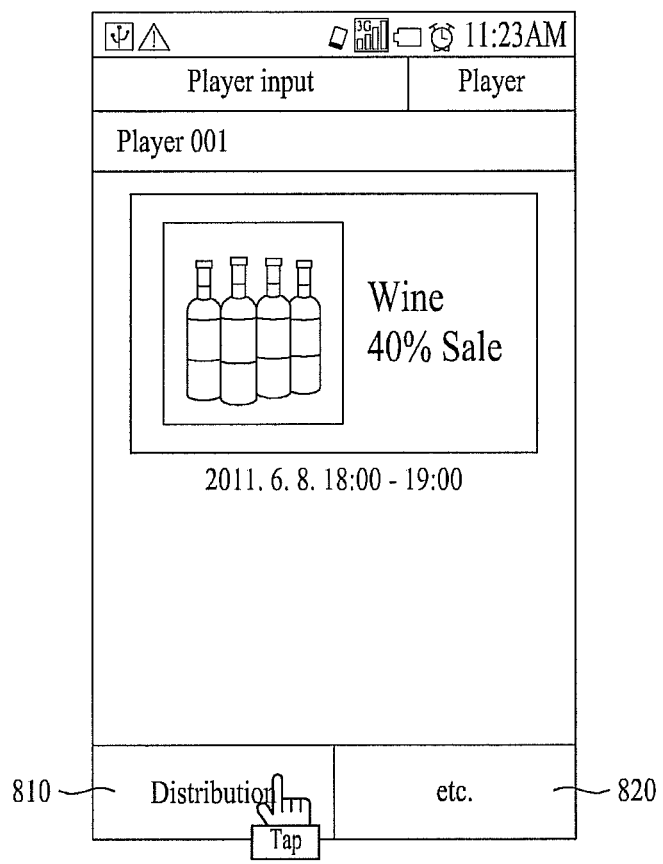

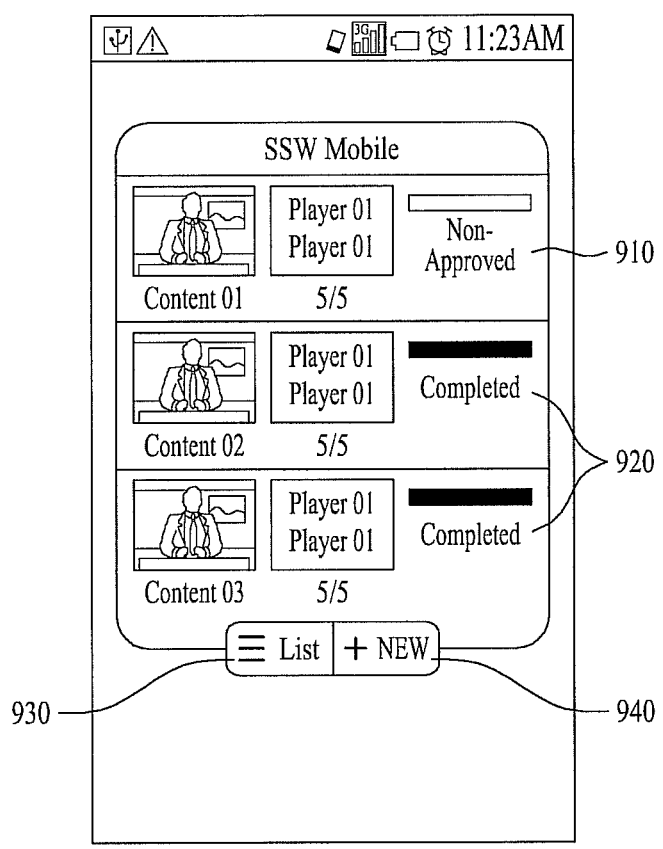
[FIG. 9]

[FIG. 10]
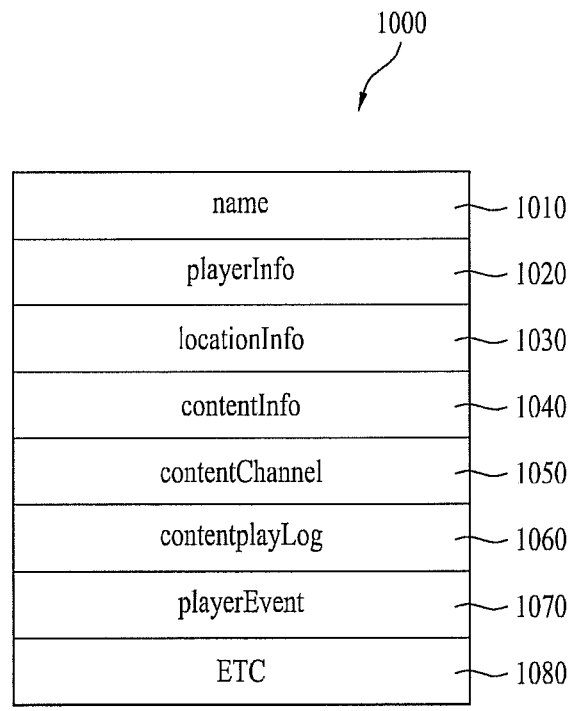
[FIG. 11]
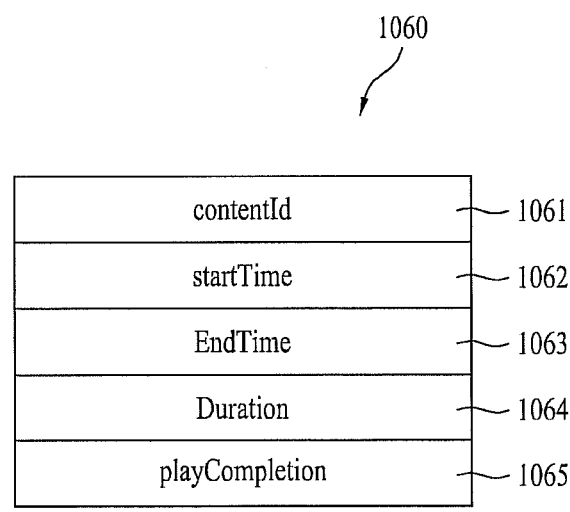

[FIG. 12]
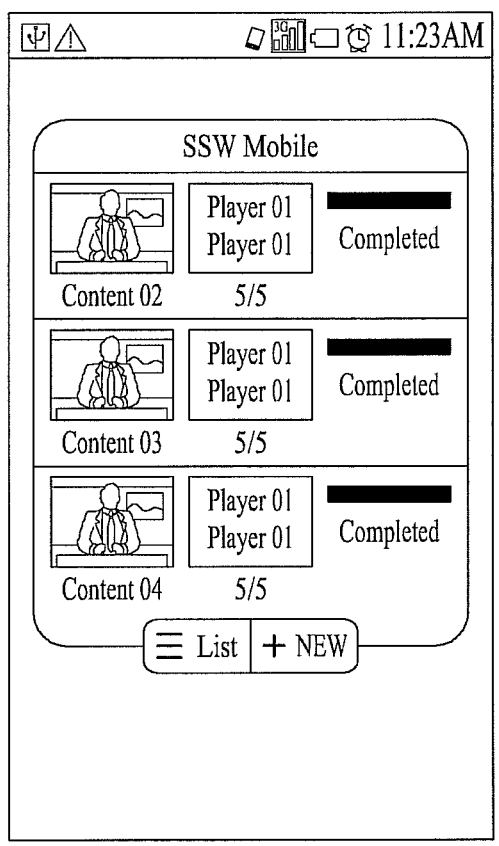

[FIG. 13]
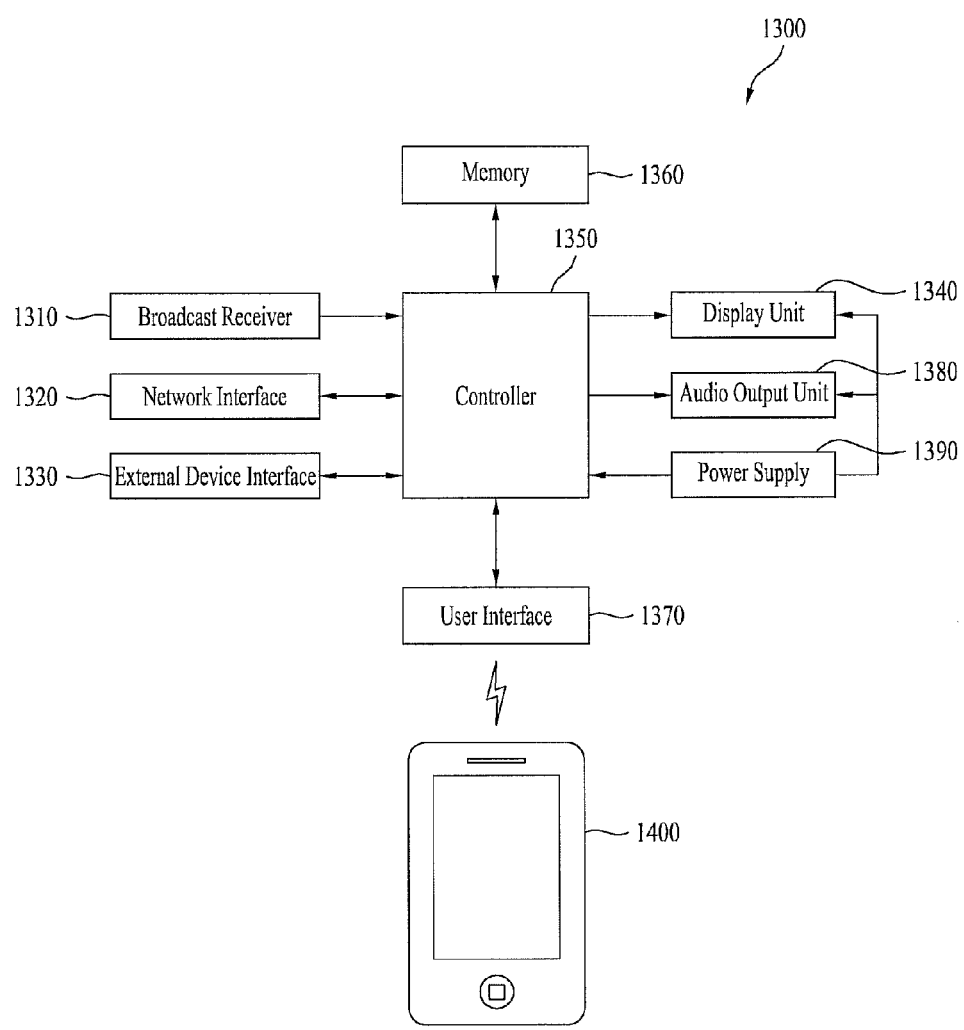

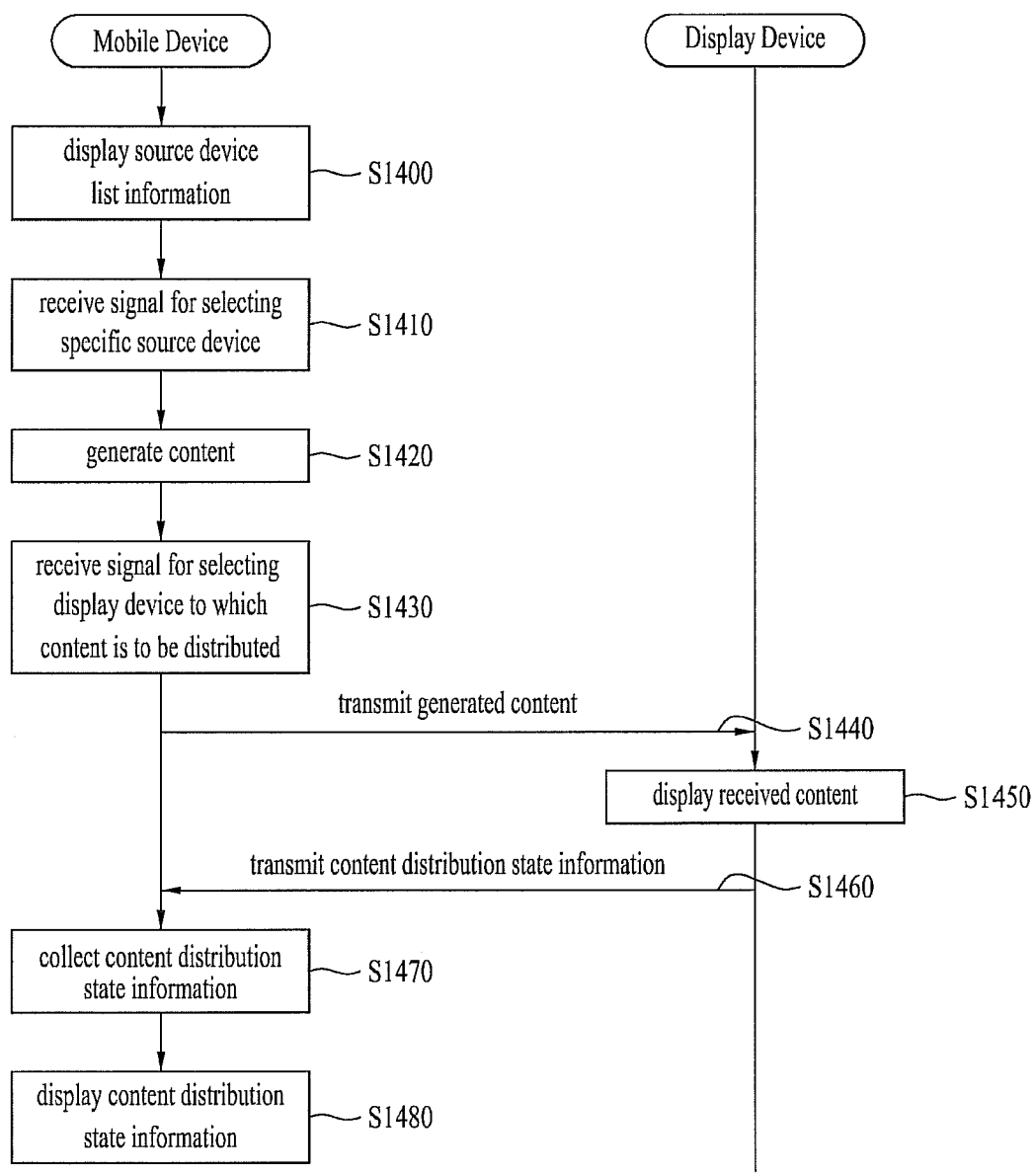

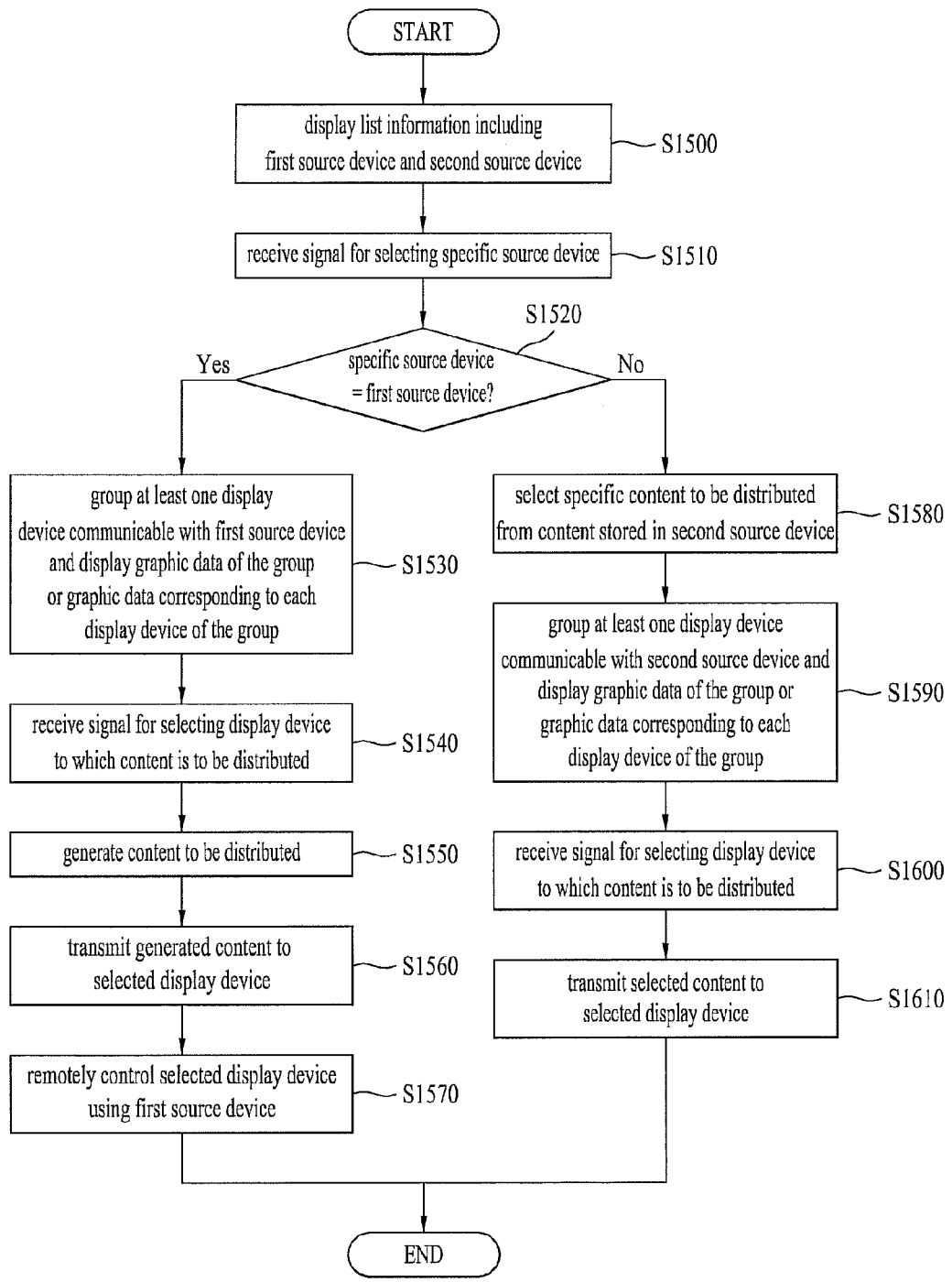

MOBILE DEVICE AND METHOD FOR CONTROLLING MOBILE DEVICE FOR CUSTOMIZING ADVERTISEMENT MESSAGES DISPLAYED ON SIGNAGE DEVICE

This application claims the benefit of Korean Patent Application No. 10-2011-0104392, filed on Oct. 13, 2011, which is hereby incorporated by reference as if fully set forth herein.

BACKGROUND OF THE INVENTION

Field of the Invention

The present invention relates to a mobile device and a method for controlling the same, and more particularly, to a mobile device and a method for controlling the same wherein content generated by the mobile device is directly transmitted to a display device without passing through a server. The mobile device is, for example, a smart phone, a Personal Digital Assistant (PDA), or a tablet PC.

Discussion of the Related Art

Digital signage is an advertising billboard display that is implemented by combining various IT technologies such as hardware, software, content, and network technologies to deliver various information and advertisements. The digital signage is installed and operated in a large building having a large number of persons passing therethrough such as a bus terminal, a public office, a bus stop, a department store, a subway, an airport, a hotel, or a hospital or in a place where people stay for a certain time such as a business, an elevator, a theater, a restaurant, a shopping mall, or a store.

In the case of a standalone digital signage as one conventional form of digital signage, a sign or a billboard is constructed of a digital information display such as a Plasma Display Panel (PDP), a Liquid Crystal Display (LCD), or a Light Emitting Diode (LED), and previously produced information and advertising content are stored in a storage unit and are manually reproduced (or played).

In the case of networked digital signage as another conventional digital signage, information and advertising content are transmitted to a digital information display through a communication network and a center performs content transmission, device status management, and the like.

FIG. 1 illustrates a system, which distributes content to a conventional display device, as an exemplary networked digital signage system.

As shown in FIG. 1, a server 100 transmits content to a display device 120 and manages the status of the display device 120. The server 100 may also separately store and manage information associated with content transmission or status management information using a management program 130 which uses a website or the like.

In addition, recently, the digital signage system is provided with a platform for brand-customized and local advertisements based on interactions such as entrance for an event, movement of a selection information item, provision of product information through touch, and also has been developed so as to support product purchase through purchase induction to adjacent stores and use of coupon and map services.

Accordingly, the market coverage of digital signage has been extended to encompass active and user-interactive advertising and marketing tools through operation in combination with the mobile device 110. In this case, the server 100 also serves as a medium through which the mobile device 110 and the display device 120 are connected to each other.

However, the digital signage system has a problem in that it is not possible to properly display content when the server 100 is not present or when an error has occurred in the server 100 since the digital signage system operates based on the server 100.

In addition, the digital signage system is inconvenient for a manager of a business, a theater, a restaurant, a shopping mall, a store, or the like in that it is not possible for the manager to easily generate content using the mobile device 110 and to immediately transmit the content to the display device 120 in order to provide discount information or real-time shop information since content should be generated and transmitted through the server 100. Such inconvenience is more serious especially when, in a store, a manager needs to quickly locate a specific display device and to distribute content to the specific display device.

SUMMARY OF THE INVENTION

Accordingly, the present invention is directed to a mobile device and a method for controlling the same that substantially obviates one or more problems due to limitations and disadvantages of the related art.

An embodiment of the present invention is to provide a system in which content generated by a mobile device can be directly transmitted to and displayed on a display device.

Another embodiment of the present invention is to provide a mobile device and a method for controlling the same wherein it is possible to generate and transmit content to a display device, regardless of a server error or the like, and to check a content distribution state or the like.

Another embodiment of the present invention is to define a data transmission protocol between a mobile device and a display device, which allows content generated by the mobile device to be directly transmitted to and displayed on the display device.

Another embodiment of the present invention is to provide a user interface that allows content, which is to be displayed on a display device, to be easily generated and distributed using a mobile device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a mobile device that distributes content to a display device includes displaying list information including a first source device and a second source device, receiving a signal for selecting a specific source device using the list information, generating content to be distributed when the specific source device is the first source device, grouping at least one display device communicable with the specific source device into a group and displaying graphic data corresponding to the group or graphic data corresponding to each display device belonging to the group, receiving a signal for selecting at least one display device using the graphic data, and transmitting the generated content to the at least one selected display device.

In another aspect of the present invention, a mobile device includes a display unit for displaying list information including at least one source device, a user interface for receiving a signal for selecting a specific source device using the list information, a content generator for generating content, a controller for controlling the content generator to generate content when the specific source device is the mobile device, and a communication unit for transmitting the generated content to at least one display device that is communicable with the specific source device and that has been selected through the user interface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a system that distributes content to a conventional display device;

FIG. 2 illustrates a system for distributing content from a mobile device to a display device according to an embodiment of the present invention;

FIG. 3 is a functional block diagram of a mobile device according to an embodiment of the present invention;

FIG. 4 illustrates an embodiment in which source device list information is displayed on a mobile device according to the present invention;

FIG. 5 illustrates an embodiment in which content is generated in a mobile device according to the present invention;

FIG. 6 illustrates an embodiment in which graphic data corresponding to a group of display devices is displayed on a mobile device according to the present invention;

FIG. 7 illustrates an embodiment in which a specific display device is selected on a mobile device according to the present invention;

FIG. 8 illustrates an embodiment in which content generated by a mobile device according to the present invention is distributed;

FIG. 9 illustrates an embodiment in which the state of distribution of content generated by a mobile device according to the present invention is displayed;

FIG. 10 illustrates an embodiment of a structure of content metadata generated in a mobile device according to the present invention;

FIG. 11 illustrates an embodiment of a structure of content metadata generated in a mobile device according to the present invention;

FIG. 12 illustrates an embodiment in which distribution state of content is displayed on a mobile device according to the present invention;

FIG. 13 is a block diagram of a display device according to an embodiment of the present invention;

FIG. 14 illustrates a data transmission protocol between a mobile device and a display device according to an embodiment of the present invention; and FIG. 15 is a flowchart of a method for controlling a mobile device according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The words "module" and "unit", which are appended to terms describing components, are merely used for ease of explanation of the present invention and thus may be used interchangeably.

The display device described in this specification is, for example, a smart network TV which has computer support functions in addition to a broadcast reception function. Specifically, the display device has Internet-related functions in addition to the broadcast reception function. The display device may also include an interface that is more convenient to use than a handwriting input device, a touchscreen, or a space remote control (for example, a pointing device). The display device may also be connected to the Internet and a computer through a wireless or wired Internet function to perform functions such as email, web browsing, banking, or gaming. The display device may use a standardized general-purpose OS to perform such various functions.

The display device described in the present invention can perform various user-friendly functions, for example, since various applications can be freely added to or removed from a general-purpose OS kernel.

The mobile device described in the present invention is, for example, a portable communication device, a portable computer, or a portable terminal and may include, for example, a display screen, a touch input unit, or a small keyboard, which are generally provided on such devices, to provide a convenient interface.

Similar to a smart phone, the mobile device may also be connected to the Internet and a computer through a wireless Internet function to perform functions such as email, web browsing, banking, or gaming. The mobile device may use a standardized general-purpose OS to perform such various functions.

Although the embodiments of the present invention will be described in detail with reference to the accompanying drawings and details included in the drawings, the present invention is not limited to or restricted by such embodiments.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

FIG. 2 illustrates a system for distributing content from a mobile device to a display device according to an embodiment of the present invention. The system for distributing content from a mobile device to a display device is described below with reference to FIG. 2. The system may be a digital signage system.

Digital signage is a digital display device that serves as a communication tool for deriving marketing, advertisement, and training effects of companies and experiences of customers and also provides not only broadcast programs but also specific information in a public place such as an airport, a hotel, or a hospital. Digital signage is also provided with software or a management platform that can control primary functions of conventional commercial digital information displays.

The digital signage system may include a central server 200, a mobile device 300, and a display device 400. The central server 200 may manage the display device 400 and the mobile device 300 and store and manage information associated with content using a management program 210 which uses a website or the like.

The display device(s) 400 may be implemented such that one display device 400 corresponds to the central server 200 or a plurality of display devices 400 corresponds to the central server 200.

The central server 200 generates or manages content that carries advertisement or information and data associated with the content. The central server 200 may include an advertising message transmitter (not shown), a content generator (not shown), a content management unit (not shown), and a content distribution and transmission processor (not shown). Of course, these components may not be included in the central server 200 but instead a content generation system, a content management system, and a content distribution and transmission processing system may be separately constructed.

The advertising message transmitter may transmit an advertising message associated with content, which is being displayed on the display device 400, to the mobile device 300.

The content generator generates content for display on the display device 400. The content generator may generate content or may process content generated by another system into a format for display on the display device 400.

The content management unit manages the content generated or processed by the content generator using a Database Management System (DBMS). For example, the content management unit easily manages a plurality of content items according to the type of a provided service such as content information, which is to be transmitted to and executed (for example, reproduced) on the display device 400, or content execution schedule information. In addition, the content management unit transmits information and advertising content to the display device 400, performs determination as to whether content is being transmitted to the display device 400, and performs status management or the like of the display device 400.

The content management unit may also allow content to be executed (or played) at an appropriate time and may report information associated with the result of the execution of the content. Accordingly, the content management unit can manage content in an integrated manner (or in a systematic manner) and can also easily measure advertising effects.

When a plurality of content items is to be executed on the display device during one day, the content schedule information includes, as basic information, ID information of the display device, date, version information including system compatibility information, and the like and includes the order of execution of content items and definitions associated with execution rules. The content schedule information may be used to check whether or not content can be executed on the display device 400 and may also be used as advertisement index analysis information.

The content schedule information may include information associated with a network that is being used (such as network provider information, network connection type indicating whether the network is wired or wireless), content execution information, and the like. The content schedule information is especially useful when the number of display devices is great.

The content distribution and transmission processor distributes content generated by the content generator to a plurality of display devices 400 and allows the content to be transmitted to and executed (i.e., displayed) on the display device 400.

Generally, content transmission schemes are classified into a polling transmission scheme in which the display device 400 requests content from the central server 200 and a broadcast scheme in which the central server 200 transmits content to the display device 400 according to a time and a situation set by the operator (or manager).

The present invention may employ the two schemes. When the broadcast scheme is used, content may be distributed in a night time zone in which the rate of network use is relatively low in order to efficiently use a limited bandwidth in consideration of an increase in use of multimedia data services. However, the broadcast scheme is not suitable when data of content items often changes and when content needs to be quickly transmitted to and executed on the display device.

The polling transmission scheme can be selected in such a case. When the polling transmission scheme is used, the display device accesses the central server 200 at intervals of a predetermined period to check whether or not data to be transmitted is present and downloads content only when needed. However, if the number of display devices 400, i.e., the number of terminals, is great when the polling transmission scheme is used, the display devices 400 need to be implemented so as to spread traffic load of the central server 200.

In this manner, it is possible to generate and manage content through the central server 200 and to transmit the content to each display device 400. However, when content is provided through the central server 200, there is a problem in that it is not possible to immediately transmit and display content to and on a specific display device or it is not possible for an onsite manger to directly control and transmit content to the display device.

In an embodiment of the present invention, content is generated through the mobile device 300 and the generated content is directly transmitted to the display device 400 without the central server 200 to maximize mobility and convenience of the manager. Thus, the mobile device 300 can generate and transmit content to at least one display device 400 and can determine content distribution states. This is described below in detail with reference to FIG. 3.

FIG. 3 is a functional block diagram of a mobile device according to an embodiment of the present invention. The embodiment of FIG. 3 is an example for explaining the present invention and an embodiment in which some modules are removed from the mobile device of FIG. 3 and an embodiment in which some modules are added to the mobile device of FIG. 3 also come within the scope of the present invention.

As shown in FIG. 3, a mobile device 300 according to an embodiment of the present invention may include a display unit 310, a user interface 320, a content generator 330, a communication unit 340, a controller 350, and a distribution state unit 360.

The display unit 310 converts an image signal, a data signal, or the like processed by the controller 350 or an image signal, a data signal, or the like received from the outside into R, G, and B signals and generates corresponding drive signals. The display unit 310 may be a PDP, an LCD, an OLED, a flexible display, a 3D display, or the like.

The display unit 310 displays list information including at least one source device. FIG. 4 illustrates an embodiment in which source device list information is displayed on a mobile device according to the present invention. The mobile device 300 may store list information of source devices that generate or store content in a storage unit such as a memory and may display the list information as shown in FIG. 4.

In the embodiment shown in FIG. 4, a central server and a mobile device are provided as source devices. Thus, a first menu 410 used to select the central server and a second menu 420 used to select the mobile device may be provided and additional selection menus may be provided if additional source devices are provided. The user can select a source device through a pointer 430 corresponding to an input means. The pointer 430 corresponding to an input means may be omitted when the display unit is a touchpad.

The user interface 320 receives, from the user, a signal for selecting a specific source device from the list information and delivers the signal to the controller 350. When the user selects the first menu 410, the mobile device 300 may move to a page which displays a list of content items stored in the server and, when the user selects the second menu 420, the mobile device 300 may move to a page which displays a list of content items stored in the mobile device or a page for generating content on the mobile device.

In this manner, a source device in which content to be transmitted from the mobile device to the display device is stored or in which content is to be generated may be determined according to user selection.

The content generator 330 generates content to be distributed under control of the controller 350 when the selected source device is the mobile device. Here, the content generator 330 may generate content using at least one of a photograph, a picture, music, video (or moving image), and text. In addition, the content generator 330 may convert the generated content into a data format that can be displayed on the display device and may generate the same content in various formats as needed.

In this manner, content can be easily and quickly generated in the mobile device 300 to allow the user to quickly distribute content appropriate for the onsite situation of the user.

FIG. 5 illustrates an embodiment in which content is generated in a mobile device according to the present invention. The user may select a photograph 510 stored in the mobile device and input a text message 520 using a virtual keyboard 530. When the user has completely input the message associated with the photograph, the user may select a file generation menu 540 to convert the photograph 510 into a format that can be displayed on the display device, thereby generating a corresponding content item. The user may add a video (or moving image) or the like or may select another content item stored in the mobile device using an ETC menu 550.

In this manner, it is possible to easily generate content by combining a photograph, text, video, and the like on the mobile device. Therefore, this embodiment has an advantage in that it is possible to easily display content associated with an ending sale or a day sale, which needs to be displayed only for a specific time, or information that is generated or changed in real time.

The communication unit 340 may transmit the generated content to a display device that is communicable with the mobile device and has been selected through the user interface 320. Here, the communication unit 340 may transmit the generated content to at least one display device or a group of display devices. The communication unit 340 may also transmit the generated content to the central server 200 to register the same in the central server 200.

FIG. 6 illustrates an embodiment in which graphic data corresponding to a group of display devices is displayed on a mobile device according to the present invention. As shown in FIG. 6, display devices may be grouped for each source device (610 and 620) and a plurality of groups may also be formed for the same source device. The user may select a desired group through a pointer 630 corresponding to an input means such as a trackball and may directly select a desired group without a pointer when a touchpad is provided.

A different display device may be communicable with each source device. Therefore, if communicable display devices are grouped for each source device, it is possible to reduce inconvenience of the user having to check whether or not each display device is communicable. Content items of a group of each source device may also be classified and grouped for each store, position, or usage, thereby maximizing user convenience.

Although not illustrated in FIG. 6, a menu that allows the user to reset or edit groups may be provided to allow the user to change group information.

FIG. 7 illustrates an embodiment in which a specific display device is selected on a mobile device according to the present invention. Similar to the embodiment of FIG. 6, when the user selects a display device group, a list of display devices included in the selected group may be displayed as shown in FIG. 7. The user may select a display device to which the user desires to transmit (710) to allow the mobile device to transmit content to the selected display device.

In the embodiments described above, a display device, to which content is to be transmitted, is selected after the content is generated in the case in which the source device is a mobile device. However, content may also be generated after a display device is selected. Thus, an embodiment, in which a display device group is selected as shown in FIG. 6 and at least one specific display device is selected from the selected group as shown in FIG. 7 and then the mobile device moves to a screen for generating content as shown in FIG. 5, also comes within the scope of the present invention.

FIG. 8 illustrates an embodiment in which content generated by a mobile device according to the present invention is distributed. As shown in FIG. 8, when the user selects a distribution execution menu 810 for generated content, the generated content is transmitted to the display device selected as in the embodiment of FIG. 7. The user may also select an ETC menu 820 to edit the content and reset the display device.

FIG. 9 illustrates an embodiment in which the state of distribution of content generated by a mobile device according to the present invention is displayed. When distribution is completed after the user selects the distribution execution menu 810, a distribution list may be displayed as shown in FIG. 9.

An uncompleted transmission display device list 910, including display devices to which transmission is uncompleted, is displayed when transmission to the display devices has not been approved due to a power condition or an error of the display devices and a completed transmission display device list 920, including display devices to which transmission is completed, is displayed when transmission to the display devices has been completed. A new distribution menu 940 may be provided in addition to a distribution list menu 930 such that it is possible to perform a procedure for generating and transmitting new content through the new distribution menu 940.

In the case in which content is generated and transmitted by the mobile device as described above, it is preferable that metadata be generated together with the content in order to easily manage the content in the central server or the mobile device.

FIG. 10 illustrates an embodiment of a structure of content metadata generated in a mobile device according to the present invention. The content metadata is described below in detail with reference to FIG. 10.

As shown in FIG. 10, the metadata may include data 1010 associated with a display device on which content is displayed, data 1020 associated with a player that executes (or plays) the content, data 1030 associated with a position at which the display device is installed, data 1040 associated with the type of content (such as video, image, or text), data 1050 used to discriminate a network through the content is transmitted when content items are transmitted through different networks, data 1060 indicating whether or not the content has actually been displayed on the display device, an event record 1070 of the player that executes the content, and ETC data 1080.

The ETC data 1080 may include information that varies depending on the target of content or information regarding a product type or the like associated with content. Here, it is preferable that information which is often changed or modified be stored in the ETC data 1080 to facilitate insertion, change, and extension of information.

The content metadata includes data 1010 indicating which display device is to execute the generated content, data 1020 indicating which player is to execute the generated content (for example, indicating hardware type, software type, etc), and data 1050 indicating a network transmission path and therefore there is an advantage in that it is possible to efficiently perform content distribution and transmission processes.

When the content metadata includes data 1060 indicating whether or not content has actually been displayed on a terminal, the content metadata can be easily used for advertising effect measurement or the like in the future.

FIG. 11 illustrates an embodiment of a structure of content metadata generated in a mobile device according to the present invention. The data 1060 of FIG. 10, which indicates whether or not content has been executed, is described below in more detail with reference to FIG. 11.

The data 1060 indicating whether or not content has actually been executed on a terminal may include data items such as a unique number 1061 assigned to each content item, an execution start time 1062, an execution end time 1063, an execution duration 1064, execution completion indication information 1065 indicating whether or not execution of content has been completed. Since the data 1060 includes such data items, the data 1060 may serve as a good guideline for analyzing and monitoring data associated with content that is executed on a display device.

On the other hand, the distribution state unit 360 may collect (current) distribution state information of content which has been distributed to at least one display device. The distribution state unit 360 may receive the state information from the central server and may also collect the state information for each display device. In addition, the distribution state unit 360 may check transfer rate of content that is currently being displayed and may also check when and to which display device a previously distributed content item has been transmitted. Accordingly, there is an advantage in that the metadata can also be used as data for measuring advertising effects or the like.

FIG. 12 illustrates an embodiment in which distribution state of content is displayed on a mobile device according to the present invention. As shown in FIG. 12, transmission state of each content item is displayed on the mobile device. The user can view content distribution state of each display device and can also view content distribution state of each source device according to settings.

When the specific source device selected through the user interface 320 is a mobile device, the controller 350 controls the content generator 330 and the communication unit 340 to generate and transmit content as described above. However, when the specific source device selected through the user interface 320 is a central server, the controller 350 may control the communication unit 340 to select and transmit at least one content item stored in the central server to the selected display device.

In an embodiment in which the selected specific source device is the central server, the controller 350 controls the user interface 320 to allow the user to select at least one content item stored in the central server. The controller 350 then transmits a transmission request signal to the central server so as to transmit from the central server to the selected content item to a communicable display device. Accordingly, there is an advantage in that the mobile device can control the central server and can transmit content to a display device which is not communicable with the mobile device.

In another embodiment in which the selected specific source device is the central server, the controller 350 controls the user interface 320 to allow the user to select at least one content item stored in the central server. The controller 350 then receives and stores the selected content item from the central server and transmits the received content item to a display device which has been set as a distribution target. This embodiment is advantageous when content that has already been generated needs to be distributed directly from the mobile device.

As described above, the mobile device can not only generate and transmit content but can also select and transmit content stored in the central server to a display device and therefore there is an advantage in that the user can conveniently control the digital signage system without accessing a separate management program for controlling the digital signage system. However, a log associated with the state of transmission, the state of reproduction on a display, and the like may be allowed to be left in the management program.

According to an embodiment of the present invention, content generated using the mobile device can be directly transmitted to the display device without passing through the central server and therefore it is possible to conveniently display content onsite in real time. This embodiment is advantageous especially when the mobile device and the display device are located close to each other.

However, there is an inconvenience of the user having to manipulate a plurality of devices if the user needs to use a separate remote control to control the display device after transmitting content in the case in which the mobile device and the display device are located close to each other. Thus, according to the present invention, the mobile device is designed such that the user can directly control the display device using the mobile device to increase user convenience.

Accordingly, the controller 350 may change the operating mode of the mobile device from a mobile device mode to a remote control mode upon receiving a remote control request signal for a display device to which content has been transmitted through the user interface 320. When the operating mode of the mobile device has been changed from the mobile device mode to the remote control mode, the communication unit 340 may transmit a control signal for controlling the display device wirelessly to the display device according to a predetermined protocol.

Here, the wirelessly transmitted control signal may be a signal for controlling a specific display device or a plurality of display devices that have received content. In the case in which the wirelessly transmitted control signal is a signal for controlling a specific display device, there is an advantage in that it is possible to perform a variety of control operations (such as volume setting and brightness adjustment).

On the other hand, in the case in which the wirelessly transmitted control signal is a signal for controlling a plurality of display devices that have received content, there is an advantage in that it is possible to conveniently perform collective and simple control operations such as a control operation for playing or stopping content although specific and various control operations such as volume setting and brightness adjustment are restricted.

Accordingly, the mobile device 300 may further include a module for setting whether to control a specific display device or to collectively control a plurality of display devices which have received content or the controller 350 may be allowed to perform such setting.

The mobile device 300 may further include a mode change button for changing the mode of the mobile device to the remote control mode or alternatively may be set to change the mode when a preset operation is performed using a key arranged on the keypad or through the touchpad. When the mode of the mobile device 300 has been changed to the remote control mode, predetermined keys among those arranged on the keypad may be used as keys for controlling the display device.

A communication protocol such as optical communication or infrared communication may be used as a protocol for transmitting and receiving a signal or the like through the wireless communication network. According to the protocol, the controller 350 may convert a control command into a signal format suitable for the protocol and transmit the converted signal to the communication unit 340.

FIG. 13 is a block diagram of a display device according to an embodiment of the present invention. The embodiment of FIG. 13 is an example for explaining the present invention and an embodiment in which some modules are removed from the display device of FIG. 13 and an embodiment in which some modules are added to the display device of FIG. 13 also come within the scope of the present invention.

The display device 1300 may receive and display content from a mobile device 1400. As shown in FIG. 13, the display device 1300 according to an embodiment of the present invention may include a broadcast receiver 1310, a network interface 1320, an external device interface 1330, a display unit 1340, a controller 1350, a memory 1360, a user interface 1370, an audio output unit 1380, and a power supply unit 1390.

The digital signage system uses display devices that are controlled to express different formats of content. In many cases, the digital signage system displays advertisement materials (or data) and allows an advertiser to purchase a display time.

Thus, the display device 1300 according to the present invention includes the broadcast receiver 1310 to display a received broadcast program when there is no need to display content. Since the display device includes the broadcast receiver 1310 to allow general TV viewing at times other than the time when an advertisement is to be displayed, there is an advantage in that utilization of the display device is increased.

The broadcast receiver 1310 may include a tuner (not shown), a demodulator (not shown), and a network interface 1320. The broadcast receiver 1310 may be designed to include the tuner and the demodulator while not including the network interface 1320 and may also be designed to include the network interface 1320 while not including the tuner and the demodulator as needed.

The tuner selects a Radio Frequency (RF) broadcast signal(s) corresponding to a channel selected by the user or all channels that have been previously stored among RF broadcast signals received through an antenna. The demodulator receives and demodulates a Digital IF (DIF) signal produced through conversion by the tuner.

A stream signal output from the demodulator may be input to the controller 1350. The controller 1350 performs demultiplexing, video/audio signal processing, and the like on the input signal and outputs a video signal to the display unit 1340 and outputs an audio signal to the audio output unit 1380.

The network interface 1320 may include, for example, an Ethernet terminal for connection to a wired network. The network interface 1320 may use, for example, a Wireless LAN (WLAN)(Wi-Fi), Wireless broadband (Wibro), World Interoperability for Microwave Access (Wimax), or High Speed Downlink Packet Access (HSDPA) communication protocol for connection to a wireless network.

The network interface 1320 may select and receive a desired application from among applications that are open to the public and may receive content from the mobile device 1400 through a wireless network.

The external device interface 1330 may connect the display device 1300 to an external device. To accomplish this, the external device interface 1330 may include an A/V input/output unit (not shown) or a wireless communication unit (not shown).

Accordingly, the external device interface 1330 may be connected wirelessly or by wire to an external device such as a Digital Versatile Disc (DVD) player, a Blu-ray Disc (BD) player, a game console, a camera, a camcorder, or a computer (laptop). The external device interface 1330 may receive an application or a list of applications in an adjacent external device and deliver the same to the controller 1350 or the memory 1360.

The display device 1300 transmits and receives data to and from the central server through a wired/wireless network including the Internet or the like since the central server is not often installed adjacent to the display device 1300. Accordingly, the display device 1300 may be connected to the central server through the network interface 1320 and the external device interface 1330 to transmit and receive content and content related data to and from the central server.

The memory 1360 may store content received from the central server or the mobile device 1400, reception information corresponding to the received content, and metadata of the content. The memory 1360 may also function to temporarily store a video, audio, or data signal input from the external device interface 1330 or the network interface 1320. The memory 1360 may also store an application or an application list input from the external device interface 1330 or the network interface 1320.

The memory 1360 may be implemented using an Electrically Erasable Programmable Read-Only Memory (EEPROM) or the like and may store a program for various signal processing and control of the controller 1350 and may also store the processed video, audio, or data signal.

The user interface 1370 delivers a signal input by the user to the controller 1350 or delivers a signal received from the controller 1350 to the user. According to an embodiment of the present invention, the mobile device 1400 may be used as a remote control. Here, the user interface 1370 may receive and process a control signal such as a power on/off signal, a channel selection signal, or a screen setting signal from the mobile device 1400 according to various communication schemes such as an RF communication scheme or an IR communication scheme or may process a control signal received from the controller 1350 so as to be transmitted to the mobile device 1400.

The display unit 1340 may display content received from the mobile device 1400. The display unit 1340 converts a video signal, a data signal, an OSD signal, or the like processed by the controller 1350 or a video signal, a data signal, or the like received through the external device interface 1330 into R, G, and B signals and generates corresponding drive signals. The display unit 1340 may be a PDP, an LCD, an OLED, a flexible display, a 3D display, or the like.

The audio output unit 1380 receives an audio signal (for example, a stereo signal, a 3.1 channel signal, or a 5.1 channel signal) processed by the controller 1350 and outputs corresponding audio. The audio output unit 1380 may be implemented as various types of speakers.

The power supply unit 1390 supplies corresponding power to each of the components of the display device 1300. For example, the power supply unit 1390 may supply power to the controller 1350 which can be implemented in the form of a System On Chip (SOC), the display unit 1340 for displaying images, and the audio output unit 1380 for outputting audio.

As described above, the mobile device 1400 transmits a user input (signal) through the user interface 1370. To accomplish this, the mobile device 1400 may use a Bluetooth, RF communication, IR communication, Ultra Wideband (UWB), or ZigBee scheme. The controller 1350 controls the display device 1300 according to a control signal received from the mobile device 1400.

When the controller 1350 has received a signal requesting content distribution state information from the mobile device 1400 or the central server, the controller 1350 may control the network interface 1320 to transmit content and reception information corresponding to the received content to the mobile device 1400 or the central server by reading the memory 1360.

FIG. 14 illustrates a data transmission protocol between a mobile device and a display device according to an embodiment of the present invention. An embodiment of the data transmission protocol between the mobile device and the display device is described below with reference to FIG. 14.

The mobile device displays information of a list of source devices (S1400). The source devices are devices which will provide content and may include a central server of the digital signage system and the mobile device.

The mobile device receives a signal for selecting a specific source device from among the source device list (S1410) and generates content when the selected specific source device is the mobile device (S1420). The content may be generated using a photograph, video, or picture file stored in the mobile device through editing and addition of text or the like. The content may have various data formats so as to be displayed on the display device.

The mobile device receives a signal for selecting a display device to which the generated content is to be distributed (S1430). Here, there may be a plurality of display devices to which the generated content is to be generated and the display devices may be selected individually or in groups.

When the display device to which the generated content is to be distributed is selected, the mobile device transmits the generated content to the selected display device (S1440). Upon receiving the content, the display device may display the received content (S1450) and may store the content, metadata of the content, and reception information thereof in a separate memory. The display device may transmit content distribution state information to the mobile device using the stored data (S1460). The distribution state information may include information indicating whether or not content transmission has been completed, information indicating when content transmission has been completed, and the like.

The mobile device may collect content distribution state information associated with a plurality of display devices using content distribution state information or the like received from the display device (S1470). The collected information may be used as reference data for performing advertising effects measurement, future content distribution date setting, and the like. The mobile device may display the distribution state information on the mobile device according to a request from the user (S1480).

FIG. 15 is a flowchart of a method for controlling a mobile device according to an embodiment of the present invention. An embodiment of the method for controlling the mobile device is described below with reference to FIG. 15. A detailed description of the same operations or processes as described above in the description of the system for distributing content from the mobile device to the display device is omitted herein.

First, the mobile device displays source device list information including a first source device and a second source device (S1500). A plurality of source devices may be provided as devices that are to provide content. The first source device may be the mobile device and the second source device may be the central server of the digital signage system.

The mobile device receives a signal for selecting a specific source device from the user through the user interface (S1510). The mobile device determines whether or not the selected specific source device is the first source device (S1520). When the specific source device is the first source device (Yes in step S1520), the mobile device groups at least one display device communicable with the first source device and graphic data of the group or graphic data corresponding to each display device of the group (S1530). As described above in the embodiment of FIG. 6, an embodiment in which a display device group is displayed for each source device and an embodiment in which a display device is directly displayed without the group also come within the scope of the present invention.

When the mobile device receives a signal for selecting, by the user, a group or a display device belonging to the group using the graphic data (S1540), the mobile device generates content to be distributed to the selected display device (S1550). The mobile device may generate the content using at least one of a photograph, a picture, music, video, and text and the user interface and the display unit of the mobile device may provide a convenient tool to allow the user to easily and conveniently generate content. Here, although the step S1550 may be performed after steps S1530 and S1540 as illustrated in FIG. 15, the present invention is not limited to the illustrated order of execution of the steps and the step S1550 may also be performed before steps S1530 and S1540.

The mobile device transmits the content to the selected display device (S1560). Since, as the first source device, the mobile device can easily generate and transmit content in the above manner, there is an advantage in that it is possible to generate and display content in real time and also to quickly cope with situations of the onsite location where the display device is arranged.

In addition, it is possible to increase user convenience since the display device can be controlled using the first source device without a separate remote control after content generated by the first source device is transmitted to the display device.

When a request to remotely control the display device selected by the user is received through the user interface of the first source device, the mode of the first source device is changed to a remote control mode. When the mode of the first source device has been changed, the first source device transmits a control signal to the selected display device wirelessly according to a predetermined protocol such that the first source device can remotely control the display device (S1570).

When the specific source device is not the first source device (No in step S1520), the specific source device may be the central server of the digital signage system, i.e., the second source device. Accordingly, the mobile device selects specific content that is to be distributed from among a plurality of content stored in the second source device (S1580). Of course, content generated by requesting new content from the central server may also be selected.

At least one display device communicable with the second source device is grouped and graphic data of the group or graphic data corresponding to each display device of the group is displayed (S1590) and then a signal for selecting at least one display device to which the selected content is to be distributed using the graphic data is received from the user (S1600).

The selected content is then transmitted to the selected display device (S1610). Here, the mobile device may transmit a transmission request signal to the central server to allow the central server to transmit the content directly to the display device and may also receive content from the central server and transmit the received content directly to the display device.

Although not illustrated in FIG. 15, the mobile device may receive distribution state information of content, which has been distributed to at least one display device, from the central server or from the at least one display device.

The mobile device may generate graphic data corresponding to the received state information using the received state information and display the generated graphic data. In this manner, the content distribution state information is provided to the user and therefore there is an advantage in that the user can easily check the distribution state using the mobile device and the user can quickly address the case in which content distribution is not being properly performed.

As is apparent from the above description, the embodiments of the present invention have a variety of advantages.

For example, since content generated by a mobile device can be directly transmitted to and displayed on a display device, it is possible to perform content generation and distribution without being affected by a server error or the like.

In addition, user convenience is increased since content can be easily and conveniently generated and can be directly distributed to a display device using a mobile device.

Further, it is possible to define a data transmission protocol between a mobile device and a display device, which allows content generated by the mobile device to be directly transmitted to and displayed on the display device.

Although the embodiments of the drawings have been separately described for ease of explanation, it is also possible to implement new embodiments by combining the embodiments of the drawings. In addition, a computer readable recording medium, which stores a program for performing each of the embodiments described, may also be designed as needed and such a computer readable recording medium also comes within the scope of the present invention.

A mobile device and a method for controlling the same according to the present invention are not limited in application to the configurations and methods of the embodiments described above and all or some of the embodiments may be selectively combined to implement various modifications.

The method for controlling a mobile device according to the present invention can be embodied as processor readable code stored in a processor readable medium provided in a network device. The processor readable medium includes any type of storage device that stores data which can be read by a processor. Examples of the processor readable medium include Read Only Memory (ROM), Random Access Memory (RAM), CD-ROMs, magnetic tapes, floppy disks, optical data storage devices, and so on. The processor readable medium can also be embodied in the form of carrier waves such as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

Both product and method inventions have been described in this specification and descriptions of the two inventions may be applied as being supplementary to each other.

What is claimed is:

1. A method for controlling a mobile device that distributes content to one or more external digital signage devices comprising a display, the method comprising:
creating an advertisement message in the mobile device to be distributed to one or more digital signage devices, wherein the advertisement message is created on the mobile device including at least one of a photograph, a picture, music, video, a moving picture, or text, and wherein the advertisement message is an advertisement for sale of an item;
displaying a list of one or more digital signage devices for transmitting the advertisement message to be displayed;

receiving a signal from a user input interface for selecting one or more digital signage devices from the list;

grouping at least one digital signage device communicable with the mobile device into a group and displaying graphic data corresponding to the group or graphic data corresponding to each digital signage device belonging to the group;

broadcasting a television channel through the mobile device by displaying the television channel on the selected one or more digital signage devices, wherein if a commercial is to be broadcast, the mobile device stops transmitting the television channel;

transmitting the advertisement message directly to the selected one or more digital signage devices, when the commercial is to be broadcast, bypassing a server associated with the selected one or more digital signage devices, wherein the mobile terminal is located in the vicinity of the one or more digital signage devices; and controlling a display of the selected one or more digital signage devices with the mobile device, wherein the mobile device controls volume setting and brightness adjustment of the selected one or more digital signage devices, wherein the selected one or more digital signage devices that displays the advertisement message are located in an area where the item is on sale, and wherein the advertisement message created in the mobile terminal is edited by the user via the mobile device after it is displayed in the selected one or more digital signage devices and the edited advertisement message is displayed in the selected one or more digital signage devices.

2. The method according to claim 1, further comprising:

receiving distribution state information of the advertisement message that has been distributed to the selected one or more digital signage devices from the mobile device;

generating graphic data corresponding to the received state information using the received state information; and displaying the generated graphic data.

3. The method according to claim 1, further comprising:

selecting specific content from among a plurality of content stored in the mobile device;

receiving the specific content from the mobile device;

grouping at least one digital signage device communicable with the mobile device into a group and displaying graphic data corresponding to the group or graphic data corresponding to each digital signage device belonging to the group;

receiving a signal for selecting at least one digital signage device using the graphic data; and transmitting the specific content to the at least one selected digital signage device.

4. The method according to claim 1, further comprising:

changing a mode of the mobile device to a remote control mode according to a remote control request signal for a specific display device; and transmitting a digital signage device control signal to the selected one or more digital signage devices according to a predetermined protocol.

5. The method according to claim 4, wherein the selected one or more digital signage devices are a display device that has received the advertisement message created in the mobile device.

6. A mobile device comprising:

a content generator for creating an advertisement message, wherein the advertisement message is created on the mobile device including at least one of a photograph, a picture, music, video, a moving picture, or text, and wherein the advertisement message is an advertisement for sale of an item;

a display unit for displaying a list of one or more external digital signage devices for transmitting the advertisement message to be displayed;

a user interface for receiving a signal for selecting one or more digital signage devices from the list;

a controller configured for:

grouping at least one digital signage device communicable with the mobile device into a group and displaying graphic data corresponding to the group or graphic data corresponding to each digital signage device belonging to the group, and broadcasting a television channel through the mobile device by displaying the television channel on the selected one or more digital signage devices, wherein if a commercial is to be broadcast, the mobile device stops transmitting the television channel;

a communication unit for transmitting the advertisement message to selected one or more digital signage devices, when the commercial is to broadcast, bypassing a server associated with the selected one or more digital signage devices, wherein the mobile terminal is located in the vicinity of the one or more digital signage devices;

the controller further configured for controlling a display of the selected one or more digital signage devices, wherein the mobile device controls volume setting and brightness adjustment of the selected one or more digital signage devices, wherein the selected one or more digital signage devices that displays the advertisement message is located in an area where the item is on sale, and wherein the advertisement message created in the mobile terminal is edited by the user via the mobile device after it is displayed in the selected one or more display devices and the edited advertisement message is displayed in the selected one or more digital signage devices.

7. The mobile device according to claim 6, wherein the controller changes a mode of the mobile device to a remote control mode according to a remote control request signal for the selected one or more digital signage devices, and the communication unit transmits a display device control signal to the selected one or more digital signage devices when the mode of the mobile device has been changed to the remote control mode.

* * * * *